(12) United States Patent
Doyle et al.

(10) Patent No.: US 7,993,600 B2
(45) Date of Patent: Aug. 9, 2011

(54) SALT DISPENSING SYSTEM

(75) Inventors: Kevin Doyle, Delray Beach, FL (US); Keith Schulte, Coconut Creek, FL (US); Bruce Johnson, Parkland, FL (US)

(73) Assignee: KBK Technologies Inc., Deerfield Beach, FL (US)

( * ) Notice: Subject to any disclaimer, the term of this patent is extended or adjusted under 35 U.S.C. 154(b) by 1178 days.

(21) Appl. No.: 11/637,683

(22) Filed: Dec. 13, 2006

(65) Prior Publication Data

US 2007/0207053 A1    Sep. 6, 2007

Related U.S. Application Data

(60) Provisional application No. 60/778,392, filed on Mar. 3, 2006.

(51) Int. Cl.
*B01D 11/04* (2006.01)
(52) U.S. Cl. .............. 422/261; 422/37; 422/256
(58) Field of Classification Search .......... 422/37, 422/105, 110, 256, 261; 222/52
See application file for complete search history.

(56) References Cited

U.S. PATENT DOCUMENTS

| | | | |
|---|---|---|---|
| 3,351,542 A | 11/1967 | Oldershaw et al. | |
| 3,804,253 A | 4/1974 | Wellman et al. | |
| 3,867,290 A | 2/1975 | Mackey | |
| 4,085,028 A | 4/1978 | McCallum | |
| 4,100,052 A | 7/1978 | Stillman | |
| 4,136,005 A * | 1/1979 | Persson et al. | 204/266 |
| 4,224,154 A | 9/1980 | Steininger | |
| 4,244,802 A | 1/1981 | Pohto et al. | |
| 4,255,246 A | 3/1981 | Davis et al. | |
| 4,336,225 A | 6/1982 | Hanford, Jr. | |
| 4,381,240 A | 4/1983 | Russell | |
| 4,439,295 A | 3/1984 | Richards | |

(Continued)

FOREIGN PATENT DOCUMENTS

EP    0590762    4/1992

(Continued)

OTHER PUBLICATIONS

Solartrope Supply Corporation, Aquar Rite—Chlorinator, http://www.solartrope.com/new/chlorinator.htm.

(Continued)

*Primary Examiner* — Sean E Conley
(74) *Attorney, Agent, or Firm* — Tangent Law Group, PLLC; Eric J. Weierstall, esq.

(57) ABSTRACT

An automated salt dispensing system operating in conjunction with an at least one salt chlorine generator with a controller, an at least one water supply pipe with an at least one inflow and an at least one outflow, an at least one water diversion pipe, an at least one actuator in communication with the controller and controlling a control valve, said control valve being coupled to said at least one water supply and said at least one diversion pipe and diverting water into said water diversion pipe. The invention further includes an at least one brine solution holding tank; and an at least one pressure differential device, wherein the at least one brine solution holding tank is coupled to said at least one pressure differential device and the controller signals the actuator and the control valve diverts water from the water supply pipe into the water diversion pipe and the at least pressure differential device draws brine solution from an at least one brine solution holding tank into the water supply line.

24 Claims, 9 Drawing Sheets

U.S. PATENT DOCUMENTS

| | | | |
|---|---|---|---|
| 4,472,256 A | 9/1984 | Hilbig | |
| 4,500,404 A | 2/1985 | Tucker | |
| 4,508,687 A | 4/1985 | Houghton | |
| 4,519,889 A * | 5/1985 | Pellegri et al. | 204/278.5 |
| 4,599,159 A | 7/1986 | Hilbig | |
| 4,657,670 A | 4/1987 | Newton | |
| 4,714,534 A | 12/1987 | Fair et al. | |
| 4,767,511 A * | 8/1988 | Aragon | 210/743 |
| 4,808,290 A | 2/1989 | Hilbig | |
| 4,861,451 A | 8/1989 | David | |
| 4,923,618 A | 5/1990 | Casberg et al. | |
| 4,992,156 A | 2/1991 | Silveri | |
| 5,019,250 A | 5/1991 | Lorenzen | |
| 5,027,853 A | 7/1991 | Walko et al. | |
| 5,037,519 A | 8/1991 | Wiscombe | |
| 5,045,187 A * | 9/1991 | Suchanek | 210/91 |
| 5,053,114 A | 10/1991 | Maddock | |
| 5,124,032 A | 6/1992 | Newhard | |
| 5,221,444 A | 6/1993 | Silveri | |
| 5,223,822 A | 6/1993 | Stommes et al. | |
| 5,239,285 A * | 8/1993 | Rak | 340/623 |
| 5,277,802 A | 1/1994 | Goodwin | |
| 5,320,748 A | 6/1994 | Dupois | |
| 5,362,368 A | 11/1994 | Lynn et al. | |
| 5,427,140 A | 6/1995 | Bosanquet | |
| 5,427,658 A | 6/1995 | Allen | |
| 5,468,360 A | 11/1995 | David et al. | |
| 5,541,363 A | 7/1996 | Weise et al. | |
| 5,567,283 A | 10/1996 | Lynn et al. | |
| 5,647,396 A | 7/1997 | Stommes et al. | |
| 5,656,771 A | 8/1997 | Beswick et al. | |
| 5,687,575 A | 11/1997 | Keville | |
| 5,732,619 A | 3/1998 | Hata et al. | |
| 5,807,473 A | 9/1998 | Sadler et al. | |
| 5,985,155 A * | 11/1999 | Maitland | 210/739 |
| 5,993,669 A | 11/1999 | Fulmer | |
| 5,993,753 A | 11/1999 | Davidson | |
| 6,096,202 A | 8/2000 | Fulmer | |
| 6,125,481 A | 10/2000 | Sicilano | |
| 6,238,555 B1 | 5/2001 | Silveri et al. | |
| 6,277,288 B1 | 8/2001 | Gargas | |
| 6,309,538 B1 | 10/2001 | Khan | |
| 6,391,167 B1 | 5/2002 | Grannersberger | |
| 6,517,713 B2 | 2/2003 | Gargas | |
| 6,551,518 B2 | 4/2003 | Gargas | |
| 6,625,824 B1 * | 9/2003 | Lutz et al. | 4/507 |
| 6,656,353 B2 | 12/2003 | Kilawee et al. | |
| 6,820,647 B1 | 11/2004 | Grecco et al. | |
| 6,938,586 B2 | 9/2005 | Manners et al. | |
| 7,061,080 B2 | 6/2006 | Jeun et al. | |
| 7,114,637 B2 | 10/2006 | Davis | |
| 7,167,087 B2 | 1/2007 | Corrington et al. | |
| 7,238,278 B2 | 7/2007 | Coffey et al. | |
| 7,291,261 B1 | 11/2007 | Rhodes | |
| 2001/0045380 A1 | 11/2001 | Khan | |
| 2003/0024809 A1 | 2/2003 | Broembsen | |
| 2005/0016592 A1 | 1/2005 | Jeromson et al. | |
| 2005/0137118 A1 | 6/2005 | Silveri | |
| 2005/0194296 A1 | 9/2005 | Lin | |
| 2006/0027463 A1 | 2/2006 | Levelle | |
| 2006/0054219 A1 | 3/2006 | Sund et al. | |
| 2006/0243328 A1 | 11/2006 | Bessmertny | |
| 2006/0283811 A1 | 12/2006 | Unhoch | |
| 2007/0012631 A1 | 1/2007 | Coffey et al. | |

FOREIGN PATENT DOCUMENTS

| | | |
|---|---|---|
| FR | 2785898 | 5/2000 |
| JP | 8189217 | 7/1996 |

OTHER PUBLICATIONS

Chloromatic Slat Water Pool Systems, Owners Manual, Model CNR and ECO-CHLOR/CNSC Series.

* cited by examiner

SALT DISPENSING SYSTEM

CROSS-REFERENCE TO RELATED APPLICATIONS

This application claims the benefit of priority of U.S. provisional patent application 60/778,393, filed Mar. 3, 2006, which is incorporated herein by reference.

FIELD OF THE INVENTION

The invention relates to a system, apparatus, and methods for monitoring, dispensing, and maintaining salt and, thereby, chlorine in a body of water, specifically an automated system for sensing salt and chlorine levels in a pool and automatically adding salt to maintain chlorine levels as produced by salt chlorine generators.

BACKGROUND OF THE INVENTION

It is common practice to chlorinate large bodies of water. Examples are the sanitizing of swimming pools, spas, the treatment of small water supplies or sewage systems, the prevention of algae growth in cooling towers, etc. to combat the occurrence and growth of micro-organisms. There are a number of problems encountered by the addition of quantities of chlorine or chlorine-containing compounds to a body of water at regular intervals in order to maintain the required chlorine concentration. Typical liquid chlorine systems suffer from the caustic and volatile nature of the chlorine in its liquid state. The shipping and handling of this liquid chlorine is both dangerous and expensive. One solution to these problems is the use of electrolysis to chlorinate the water. Electrolysis requires salinating the water to between 0.2% and 0.8% by weight of sodium chloride and then passing the salinated water through an electrolytic cell that has spaced electrodes coupled to a source of d.c. voltage. In most of these applications, the pH of the water being treated must be kept within narrow limits, for example 7.5.+-.0.1 pH units.

The current flowing between the electrodes forms a hypochlorite solution which has the effect of killing off and preventing the growth of micro-organisms. There are many types and forms of electrolytic cells that may be used in the chlorination of pools and spas and water supplies. Some are positioned in the plumbing associated with the filtration plant of a pool, while others are suspended or immersed directly into a body of water.

For domestic swimming pools and spas, the electrolytic cell usually runs at a d.c. voltage of between 18 to 26 volts, enabling a current of between 4 to 6 amps to flow between the electrodes of the cell. The supply of the d.c. voltage is usually from a power pack that would include a step down transformer and a rectifier to step down the a.c. mains voltage to the d.c. voltage of between 18 and 26 volts.

One problem with electrolytic chlorination systems and other systems is that, due to the addition of fresh water through rain, leaks, or other means the salt level is reduced. This requires the addition of salt into the body of water to be sanitized. In the electrolytic chlorinator system, the salt is important to both the maintenance of the water and to the maintenance of the equipment. Too little will not allow sufficient chlorine to be produced and too much salt can damage the pool equipment.

Typically, the salt chlorine generators sanitize the pool on a daily basis. Thus most electrolytic chlorine systems have the ability to check the salinity level of the pool and will indicate to the user when the system requires additional salt. Even if the salt condition is not brought to the immediate attention of the user, to regain the desired salinity can require the addition of large quantities of the salt composition. However, the alerts from these types of systems often go unattended by the typical end user, resulting in an even greater salt imbalance. Generally, a minimum of 1 to 2 bags can be required, especially after a heavy rain. These bags are typically bought at pool supply stores and weigh 40 to 80 pounds each. This can be an inconvenience, especially for the older end user, and is still a difficult task for the general end user.

Thus a need exists for a system that would automate and reduce the possibility of large scale salt imbalances in electrolytic chlorinator systems by providing a convenient and efficient manner for adding salts to water for chlorination. Such a system would automate the salt dispensing into the pool or body of water and keep the salinity levels at optimum operating levels for the electrolytic cell chlorinator. This would help keep algae growth down and extend the life of the typical electrolytic cell.

SUMMARY OF THE INVENTION

An object of the invention is to automate dispensing of salt as required by salt chlorine generators or a salinity sensor.

A further object of the invention is to provide a system to automate dispensing of salt as required by salt chlorine generators or salinity sensor(s).

The invention includes a system, an apparatus, and methods for monitoring and maintaining the salt levels in a body of water.

The method of the invention includes a method of operating a salt dispensing system with an at least one salt chlorine generator to treat water having the method steps of monitoring an at least one sensor for and detecting an indication of an add_salt condition, determining if dispensing is required; detecting salt solution levels in a brine tank, if sufficient salt solution is detected in the tank, skip the fill steps and go to the adding step; Filling a salt solution storage tank with water to create a salt solution, adding a measured amount of the salt solution to said water; and interrogating the at least one sensor to detect if the add_salt condition exists.

The apparatus of the invention includes an automated salt dispensing system operating in conjunction with an at least one salt chlorine generator having a controller, an at least one water supply pipe with an at least one inflow and an at least one outflow, an at least one water diversion pipe, an at least one actuator in communication with the controller and controlling a control valve, said control valve being coupled to said at least one water supply and said at least one diversion pipe and diverting water into said water diversion pipe, an at least one brine solution holding tank and an at least one pressure differential device, wherein the at least one brine solution holding tank is coupled to said at least one pressure differential device and the controller signals the actuator and the control valve diverts water from the water supply pipe into the water diversion pipe and the at least pressure differential device draws brine solution from an at least one brine solution holding tank into the water supply line.

The apparatus of the invention includes an automated salt dispensing system operating in conjunction with an at least one salt chlorine generator having a controller, a first water supply pipe of an at least two water supply pipes with an at least one inflow end and an at least one outflow end, a second water supply pipe of an at least two water supply pipes with an at least one inflow end and an at least one outflow end, an at least one brine solution holding tank having at least one of salt, water, and brine contained therein to form a brine solution and coupled to said a second water supply pipe of an at least two water supply pipes, an at least one actuator in communication with the controller and controlling a control valve, said control valve being coupled to said second water supply pipe of an at least two water supply pipes and said at least one brine solution holding tank, the control valve controlling the flow of water into the brine solution holding tank from the second water supply pipe and an at least one pressure differential device, wherein the at least one brine solution holding tank is coupled to said at least one pressure differential device and the controller signals the at least one pressure differential device to withdraw brine solution and allow the brine solution to enter the first water supply line.

The apparatus of the invention includes a computer system with software for operating a salt dispensing system operating in conjunction with an at least one salt chlorine generator, including a monitoring code segment monitoring an at least one sensor for an indication of an add_salt condition in a flow of water within the salt dispensing system, a determining code segment, determining if dispensing is required and upon detection of an add_salt condition, wherein if dispensing is required the determining code segment detects salt solution levels in a brine solution tank and preparers the salt solution through the control of water within the salt dispensing system in conjunction with salt within the brine solution tank, but if sufficient salt solution is detected in the tank the determining code segment skips the preparation step and engages the adding segment, an adding code segment instructing the salt dispensing system to discharge a measured amount of the salt solution into said water, an interrogating code segment interrogating the at least one sensor to detect if the add_salt condition exists and a return segment detecting whether an add_salt condition continues to exist and looping back to the adding code segment if an add_salt condition is detected and if an add_salt condition is not detected shutting the salt dispensing system off or returning the salt dispensing system to the monitoring code segment.

Moreover, the above objects and advantages of the invention are illustrative, and not exhaustive, of those which can be achieved by the invention. Thus, these and other objects and advantages of the invention will be apparent from the description herein, both as embodied herein and as modified in view of any variations which will be apparent to those skilled in the art.

BRIEF DESCRIPTION OF THE DRAWINGS

Embodiments of the invention are explained in greater detail by way of the drawings, where the same reference numerals refer to the same or similar features.

DETAILED DESCRIPTION OF THE INVENTION

Definitions

In describing the invention, references are made to various terms of art. To further the description, the following definitions and non-limiting examples are provided for additional clarity.

A "computer" or "computer controller" or "controller" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; a CMOS, an ASIC, a programmable microchip, an application specific plurality of programmable microchips, and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device or storage media used for storing data accessible by a computer. Examples of a computer-readable medium include: a magnetic hard disk; a floppy disk; an optical disk, such as a CD-ROM, flash memory, RAM memory, ROM memory and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; operating systems; machine executable code; code segments; instructions; computer programs; and programmed logic.

A "computer system" refers to a system having a computer, where the computer comprises a computer and a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); CAN/LIN networks, and a combination of networks, such as an internet and an intranet.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

Figure 1:
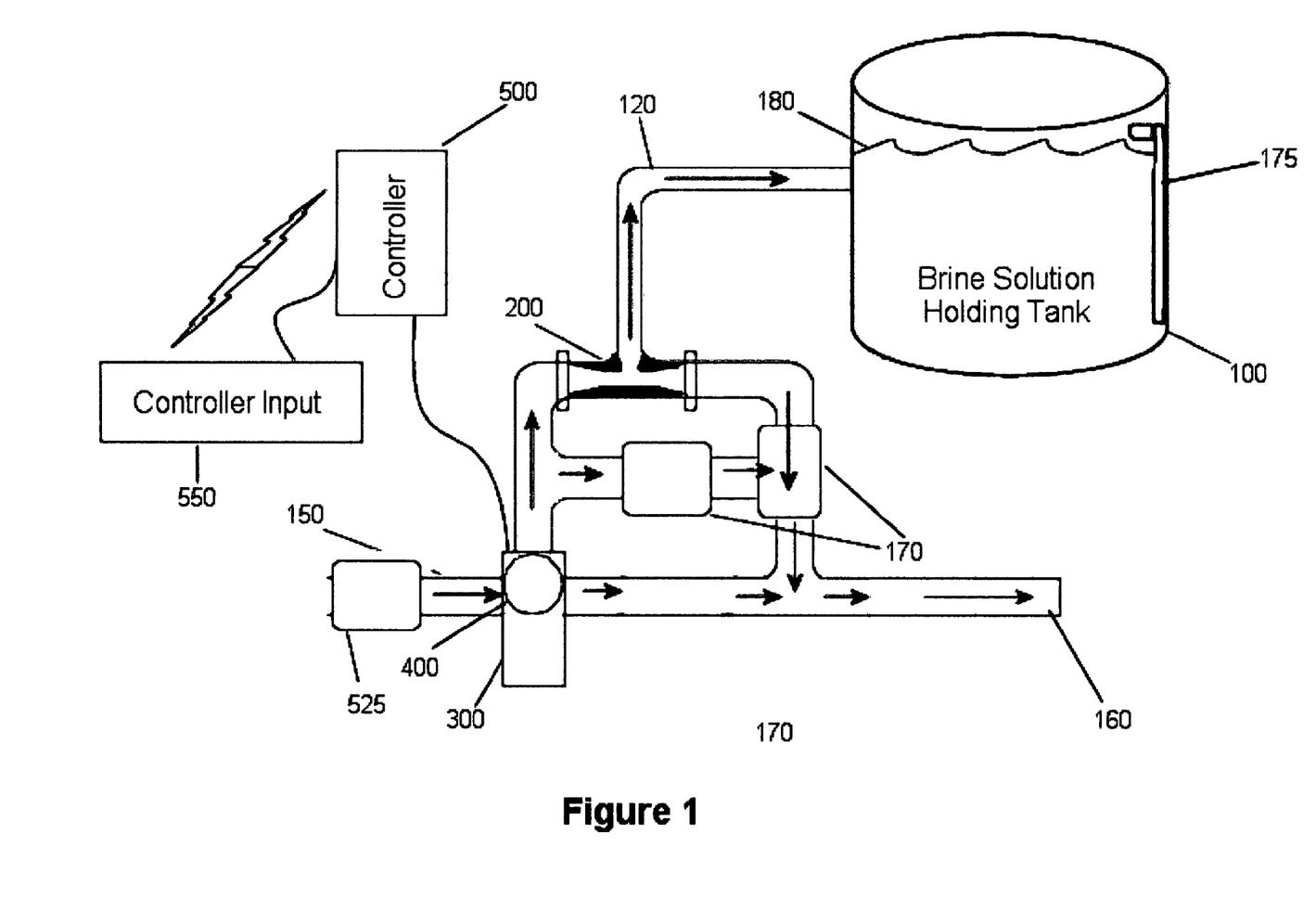
FIG. 1 illustrates a system perspective of an exemplary embodiment of the instant invention in a fill mode.

FIG. 1 illustrates a system perspective of an exemplary embodiment of the instant invention in a fill mode. The system comprises in part a water supply line 150 with water flowing in from a source, a large salt or salt brine solution tank 100 which holds an amount of salt in a brine solution, and an outflow line 160 leading to a chlorinator 525. Although depicted as a single tank, the system can function equally well with multiple tanks or holding vessels and can supply multiple chlorinator units. Similarly, the system is not limited by the number or size of the inflow and outflow lines, the system can be scaled up to meet larger service requirements while still remaining within the spirit of the invention. In a typical residential pool setting for example the brine contained in the tank can be, but is not limited too, a range of anywhere from 250-450 pounds of salt solution.

In this exemplary embodiment, a single water line 150 is coupled to a diversion or flow line 120, which provides the water to the salt or brine solution tank 100. The water level in the salt brine solution tank 100 is controlled by a float valve 175. Thus, a controlled amount of water is allowed into the salt brine solution tank 100. The single water line 150 is connected to the tank through a pressure differential device 200, in this instance a venturi suction fitting. The flow line 120, depending on the pressure provided by the pressure differential device 200, can act as the water inlet to the salt brine solution tank 100 in a fill mode, as shown in FIG. 1, and a water outlet from the salt brine solution tank 100 for the brine solution in a drain mode, as further shown and describe with respect to FIG. 2.

The inflow of water from the single water line 150, as shown by the directional arrows in FIG. 1, flows into the salt solution tank 100 and mixes the salt and the water in the salt brine solution tank 100 until it becomes saturated, creating a brine solution 180. A typical dilution ratio in a residential pool setting can be for instance, but is not limited to, one gallon of water dissolving approximately three pounds of salt. The process of saturating the inflow of water is dependent on a number of variables. This can include, but is certainly not limited to, the temperature of the incoming water, the time the water is in the tank, the form of salt, the type of salt, the flow characteristics within the tank, and similar variables that affect the breakdown and absorption of the salt. These and similar variables with respect to the conditions in the tank can be monitored by sensors which can be in communication with a controller 500.

Controller 500, here shown as a single controller but certainly not limited to a single controller, controls the valve actuator(s) 400 and, thereby, the operation of the salt dispensing system. The controller 500 regulates when to turn the actuator(s) on or off based on signals received from an at least one controller input. The at least one controller input 550 can be conventionally or wirelessly communicating with the controller. The at least one controller input 550 can be any number of sensors for detecting and communicating conditions for the body of water, the chlorinator, the inflow water, the outflow water, conditions and variables for the brine solution and brine solution tank, a master controller, a manual controller or similar sensor or control inputs. Additionally, an information storage device can be provided as part of the controller or in communication with the controller. The information storage device can store performance data, historical data, or similar data utilized or received by the controller.

The inflow line passes water through a valve 300 controlled by an actuator 400, which is in communication with controller 500. The actuator 400 controlled valve 300 provides a vast improvement over manually controlled counterparts. The actuator is programmed to provide smooth incremental changes over a wide degree of angles. The actuator has a controller on it with a stepper motor or an equivalent to operate the valve based on commands from the controller. Additionally, the actuator provides for integration with and communication with the controller of the system. Additional valves and actuators may be utilized, as further described with respect to FIG. 3 below. The venturi fitting provides positive pressure in the flow line 120 based on the velocity and/or direction of the water flowing through the fitting, as detailed in U.S. Pat. No. 5,863,128 to Mazzei and in similar devices known in the art.

In the exemplary embodiment shown in FIG. 1, during the fill mode the actuator 400 controls the valve 300 to regulate the amount of water that passes through the venturi fitting, thus regulating the amount of differential pressure. If the differential pressure is not high enough for example less the 4 psi, then water travels up the fitting and into the tank. In the exemplary embodiment shown, the single actuator 400 can open valve 300 thereby reducing the flow through the plumbing loop and allowing a very low volume of water to pass through the venturi and thus into the brine solution holding tank 100. This will allow the tank to fill. A float valve 175 regulates the amount of water entering the tank and the controller can engage the actuator 400 to change the volume of flow and thereby the pressure at the pressure differential device 200. Alternatively, another method of using the venturi fitting as the pressure differential device 200 is by controlling the direction of flow through the fitting, that is as the water flows in one direction it withdraws solution from the tank and when reversed it fills the tank. This can be accomplished with multiple actuators as well, for instance, as discussed in relation to FIG. 3.

Figure 2:
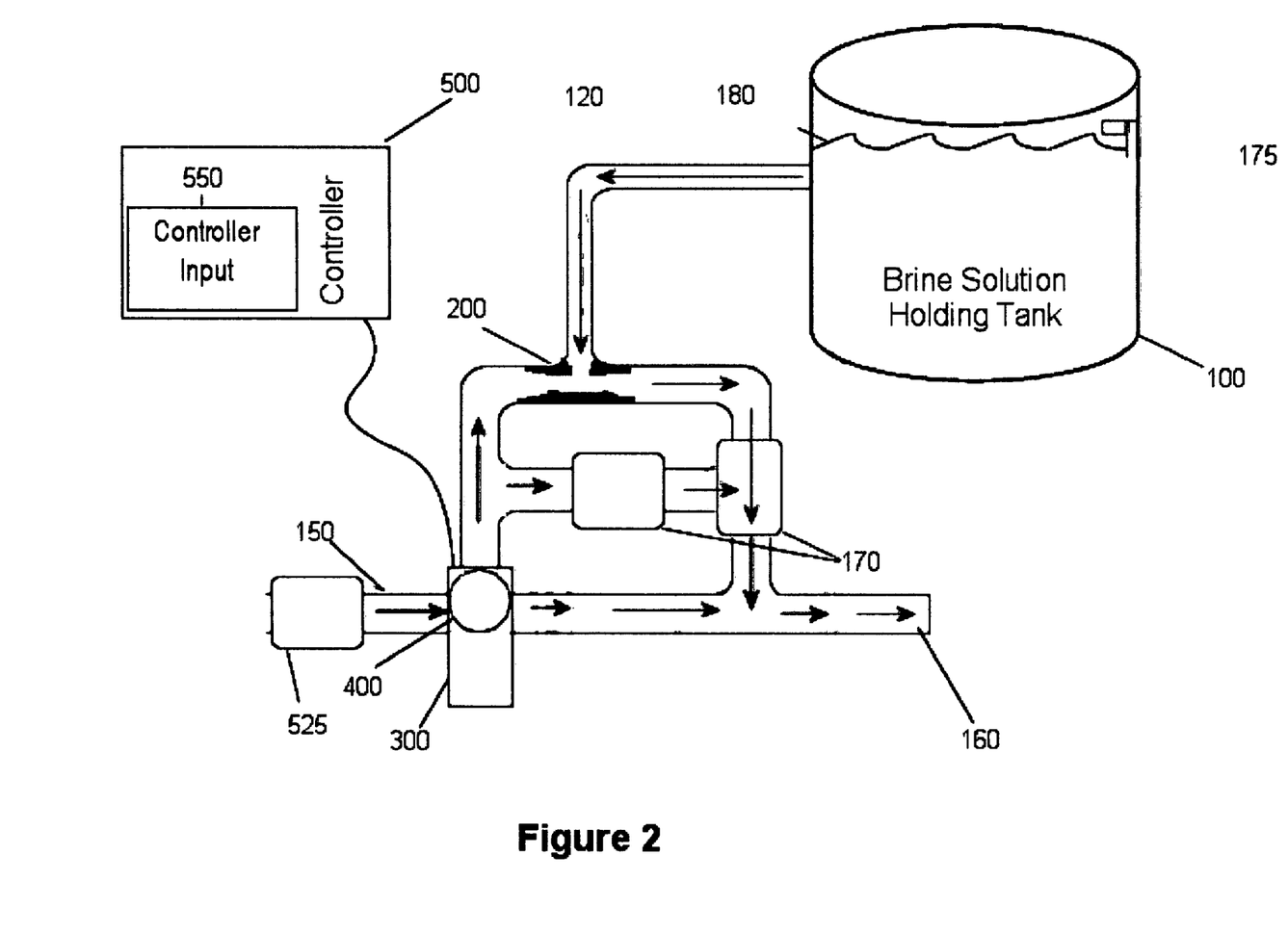
FIG. 2 shows a further system perspective of the exemplary embodiment of FIG. 1 of the instant invention in a drain mode.

FIG. 2 shows a further system perspective of the exemplary embodiment of FIG. 1 of the instant invention in a drain mode. In FIG. 2, draining begins when a suction force is created within the venturi fitting acting as a pressure device 200 from directed water flow. The venturi fitting provides negative pressure in the fill line 120. This begins the withdrawal of the brine solution 180 from the tank 100, as shown by the directional arrows indicating flow and is initiated by the controller 500 activating with the actuator 400 and turning the three way valve 300.

Figure 3:
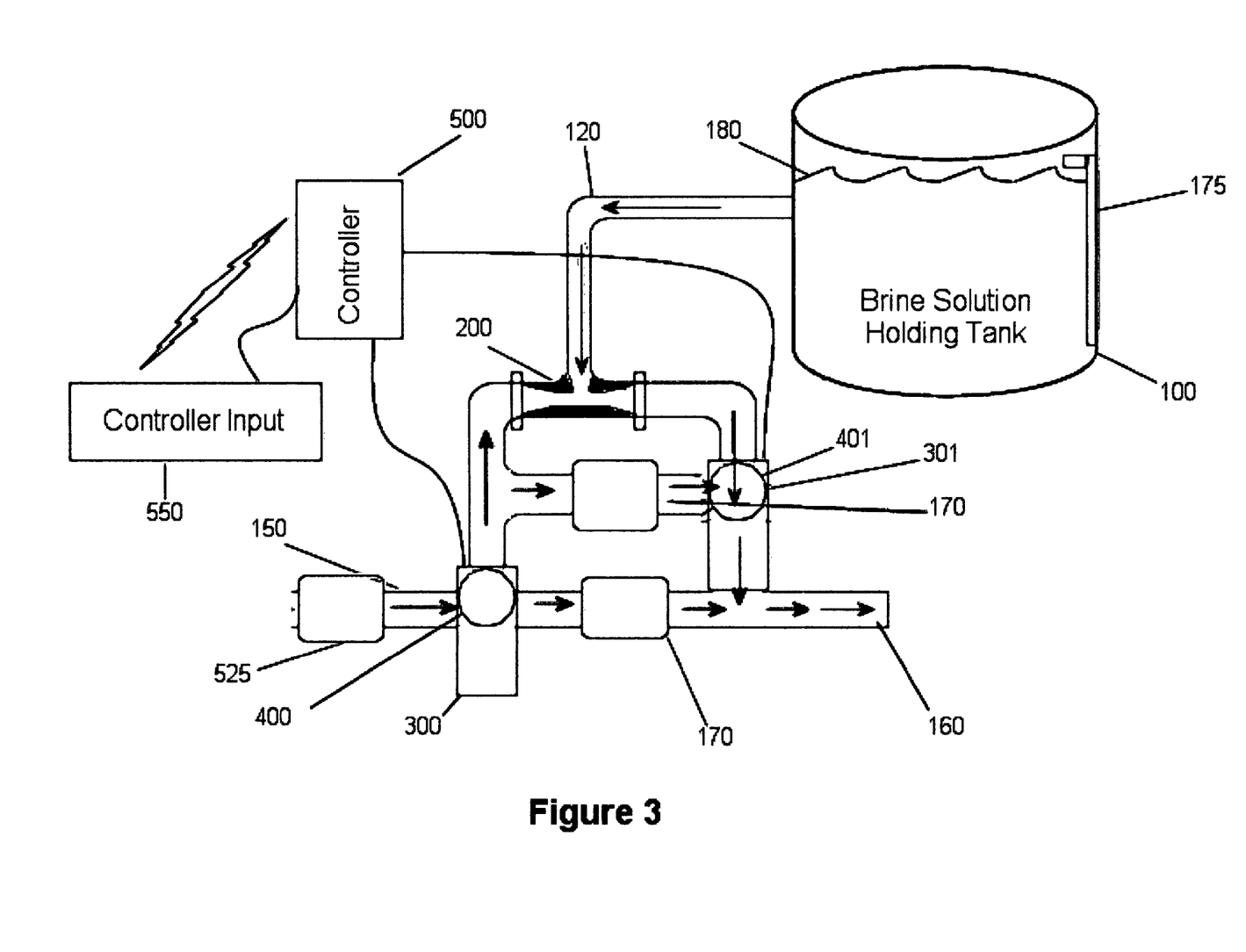
FIG. 3 shows a system perspective of an exemplary embodiment of the instant invention in the draining mode using two actuators.
Figure 4:
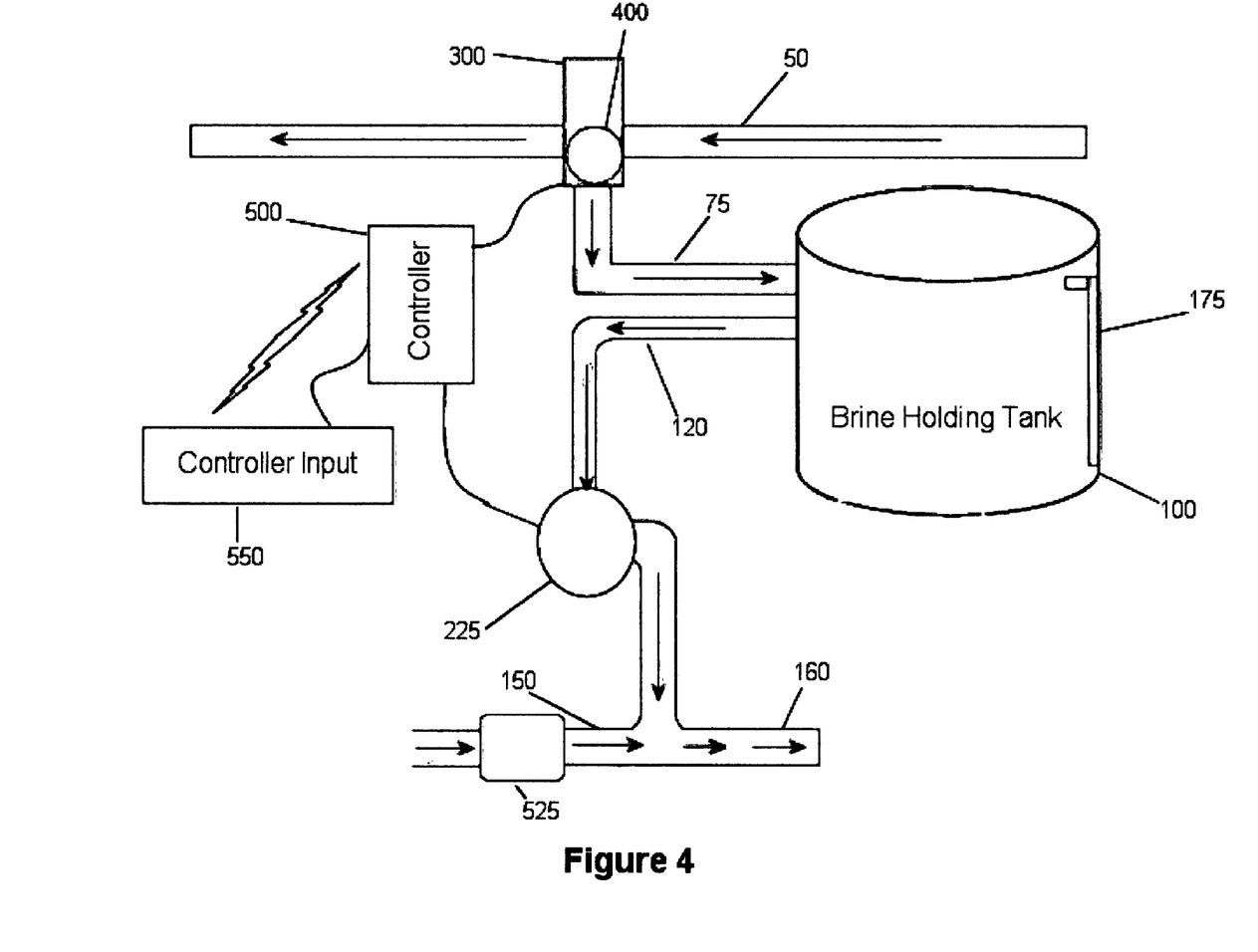
FIG. 4 shows a system perspective of an exemplary embodiment of a dual water line version of the instant invention.
Figure 5:
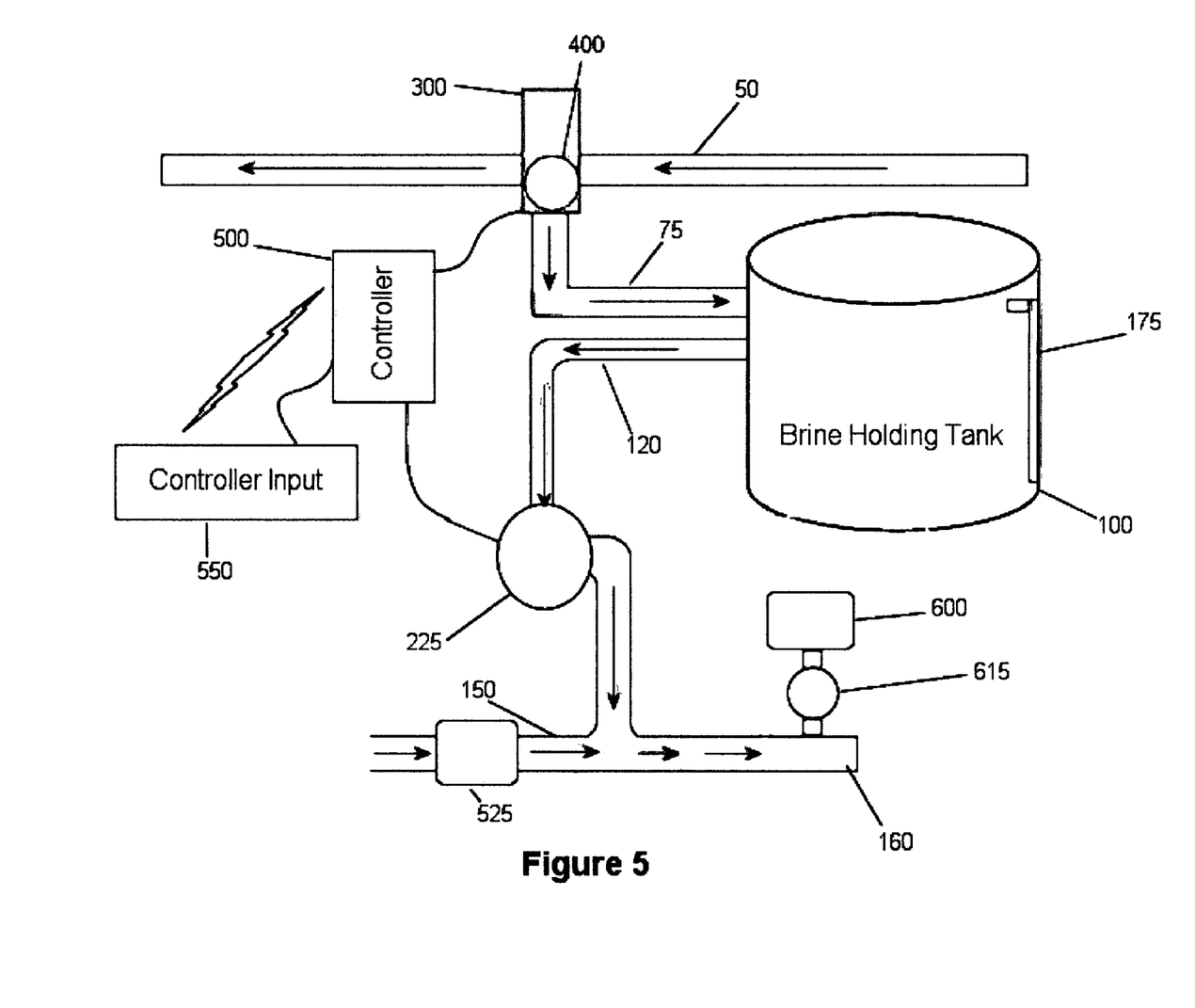
FIG. 5 shows a system perspective of an exemplary embodiment of a dual water line version of the instant invention with an acid compensator.

In the exemplary embodiment shown, the brine solution withdraws the salt saturated water or brine solution 180 from the salt brine solution holding tank 100 into the outflow of water 160, typically through for instance a pool or spa water return line or, if a separate return is used, through the separate line, as further shown in FIGS. 4 and 5. Other methods which brine or salt can be dispensed include, but are not limited to, gravity, pumps and similar mechanism to transfer brine or salt into a body of water, as further shown in the exemplary embodiments in FIGS. 3-5.

A check valve 170 is also installed in a loop that helps create the proper pressure and flow to regulate a consistent pressure differential for pressure differential device 200. A manual adjustment valve 175 can also be provided, as seen in FIG. 2. The adjustment valve 175 can allow for manual adjustment to add additional restriction and thus provide a greater or lesser pressure differential if necessary. In the embodiment of FIGS. 1 and 2, the amount of suction created by the pressure differential device 200, here the venturi suction fitting, regulates the amount of salt brine solution drained from the salt brine solution tank 100 and is directly proportional to the degree to which the valve actuator 400 opens the three-way valve 300.

In this exemplary embodiment, the goal is approximately 1 gallon per minute for both the fill and drain cycles. Depending on the size of the application, this flow rate can be adjusted. Although a venturi system is utilized in the exemplary embodiment, there are many other types of methods to add and drain water from the brine tank as seen in further embodiments of FIGS. 3 through 5. Some non-limiting examples of pressure differential devices include, but are not limited to, pumps, parastolic pumps, existing pool pumps, additional venturi devices, and other suitable devices.

FIG. 3 shows a system perspective of an exemplary embodiment in the draining mode of the instant invention using two actuators. In this exemplary embodiment, the fill and drain mode of the salt dispensing system are controlled by a pair of actuators 400, 401. The controller 500 is in communication, either wired or wireless, with each of the actuators 400, 401 and, based on the at least one control input, can open or control each of the three-way valves 300, 301. In the fill mode, the first actuator 400 activates the three-way valve 300 and the second actuator 401 remains closed. This allows water to flow directly from the water inflow 120 into the water supply line 150 and to brine solution holding tank 100. When entering the drain mode, the second actuator 401 is operated and the three-way valve 301 is opened, allowing water to flow through the pressure differential device 200, the venturi suction fitting, creating a pressure differential that withdraws the brine solution 180 from the brine solution holding tank 100. A non-limiting example of an alternative to the venturi suction fitting as a pressure differential device 200 can be, for instance, the substitution of a parastolic pump or the use of the existing pool pump, which can be used to withdraw the brine solution.

FIG. 4 shows a system perspective of an exemplary embodiment of a dual water line version of the instant invention. In this embodiment, a second water supply line 50 is provided. This second water line 50 can represent, for instance, a separately plumbed supply line, which can be for example, but is not limited to, a separate line from a domestic household water supply. This provides water to a fill line 75 that couples the second water line 50 to the brine solution holding tank 100. As with the previous embodiments described above, a fill line 120 is provided, here acting as a drain line, and is coupled to a water supply line 150 going from the brine solution storage tank 100 to the chlorinator 525 and the body of water.

Again, a controller 500 is located with the system and an at least one control input 550 providing data to the controller. The controller 500 controls, for example, an actuator 400 which controls the position of the valve 300. The actuator 400 controls the filling mode of this embodiment. In addition to the actuator 400 and three-way valve 300, further exemplary embodiments can utilize, for example, a pump or similar device and actively pump water into the brine holding tank.

In either case, the water from the second water supply line 50 is mixed in the brine salt solution 180 as discussed above. It is pumped by pump 225 out of the brine solution tank 100 through fill line 120 into the first water supply line 150, which can for instance be a return line to a pool or spa. The pump 225 is also controlled by the controller 500 and the movements of the at least one actuator 400 and valve 300 are carefully coordinated with the operation of the pump 225.

FIG. 5 shows a system perspective of an exemplary embodiment of a dual water line version of the instant invention with an acid compensator. In this exemplary embodiment the system is provided with an acid compensator unit 600 to automatically balance the pH of the water being supplied. As chlorine is added to the system via the brine solution passing through the out flowing water and the salt chlorine generator unit 525 generates chlorine, a pH imbalance is often created. This imbalance can be sensed by a s sensor or as part of the controller input 550 during the operation of the salt dispensing unit in the fill mode.

An amount of acid can be released by an acid compensator unit 600 into the outgoing water to balance the pH of the water. The acid compensator can be located anywhere within the system. In the exemplary embodiment, the acid compensator unit has its own parastolic pump 615 coupled to the water line 150 and adds measured amounts of an acidic solution to the water to balance the pH of the water in water line 150 after it passes through the salt chlorine generator 525. The acid compensator unit is in communication with the controller 500 and is integrated into the operation of the system. An additional sensor or sensors measuring pH can be located anywhere in the system and this information can be reported to the controller 500 to adjust the flow from the acid compensator device 600.

Figure 6A:
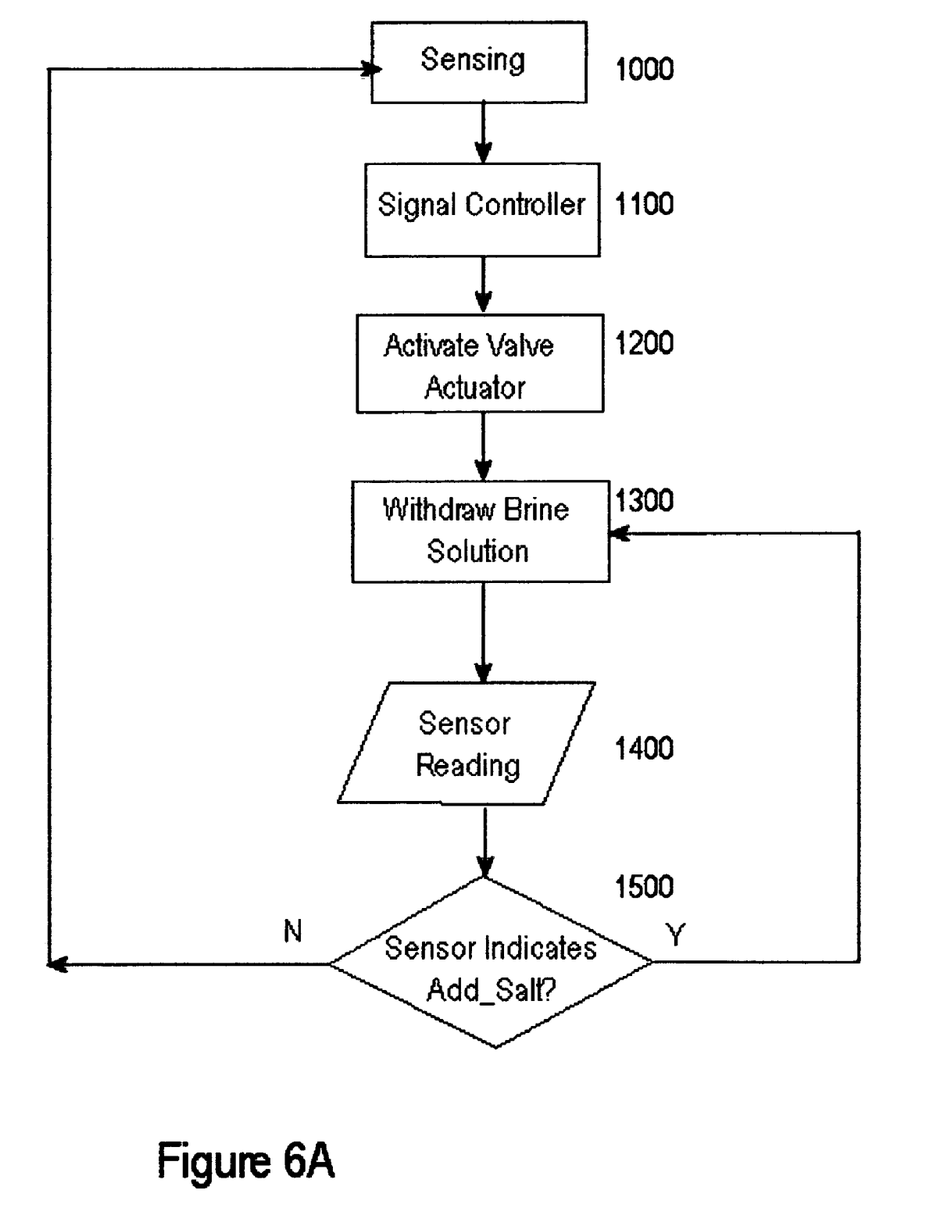
FIG. 6A is a flow chart of a exemplary method of operation for an exemplary embodiment of the salt dispensing system.

FIG. 6A is a flow chart of an exemplary method of operation for an exemplary embodiment of the salt dispensing system. This method begins at the start up of the system and can either be continuously set and monitored by the controller or can be part of a timer setup running on the pool pump schedule. The method of operating the system includes a first stop of sensing whether the water body of water needs salt added in method step 1000. Upon a positive response from the sensing step 1000 that salt is needed, a signal is sent to the controller in step 1100, indicating to the controller that action is needed. This communication can be via any wired, wireless or similar protocol and can be part of a larger network of controllers or computers controlling a large network servicing a large body or source of water. For example, the signals to and from the controller can be communicated via a 485 communication port or similar wired signal carrier to the controller. The controller, in response activates the valve actuator(s) in step 1200. In this method of operation, the system runs with a continuously filled brine solution holding tank. The valve actuator(s) receives the signal and activates the valve sending the water through the plumbing loop, creating a suction force in the venturi suction fitting.

The suction force or vacuum created by the venturi fitting draws a regulated amount of salt saturated water from the tank into the body of water through the plumbing as indicated in step 1300. After a predetermined time or after a predetermined amount of brine solution is withdrawn, a further sensor reading is made to check for an indication of a lack of salt in step 1400. If the sensor reading indicates a continued lack of salt at step 1500, the method of operation loops back to the withdrawal step 1300 and a regulated amount of brine solution continues to flow from the brine solution holding tank. If the sensor reading indicates no lack of salt at step 1500, the controller reverses the actuator(s) and the withdrawal step is stopped and the method loops back to step 1000 and the system is reset to its initial sensing step.

Figure 6B:
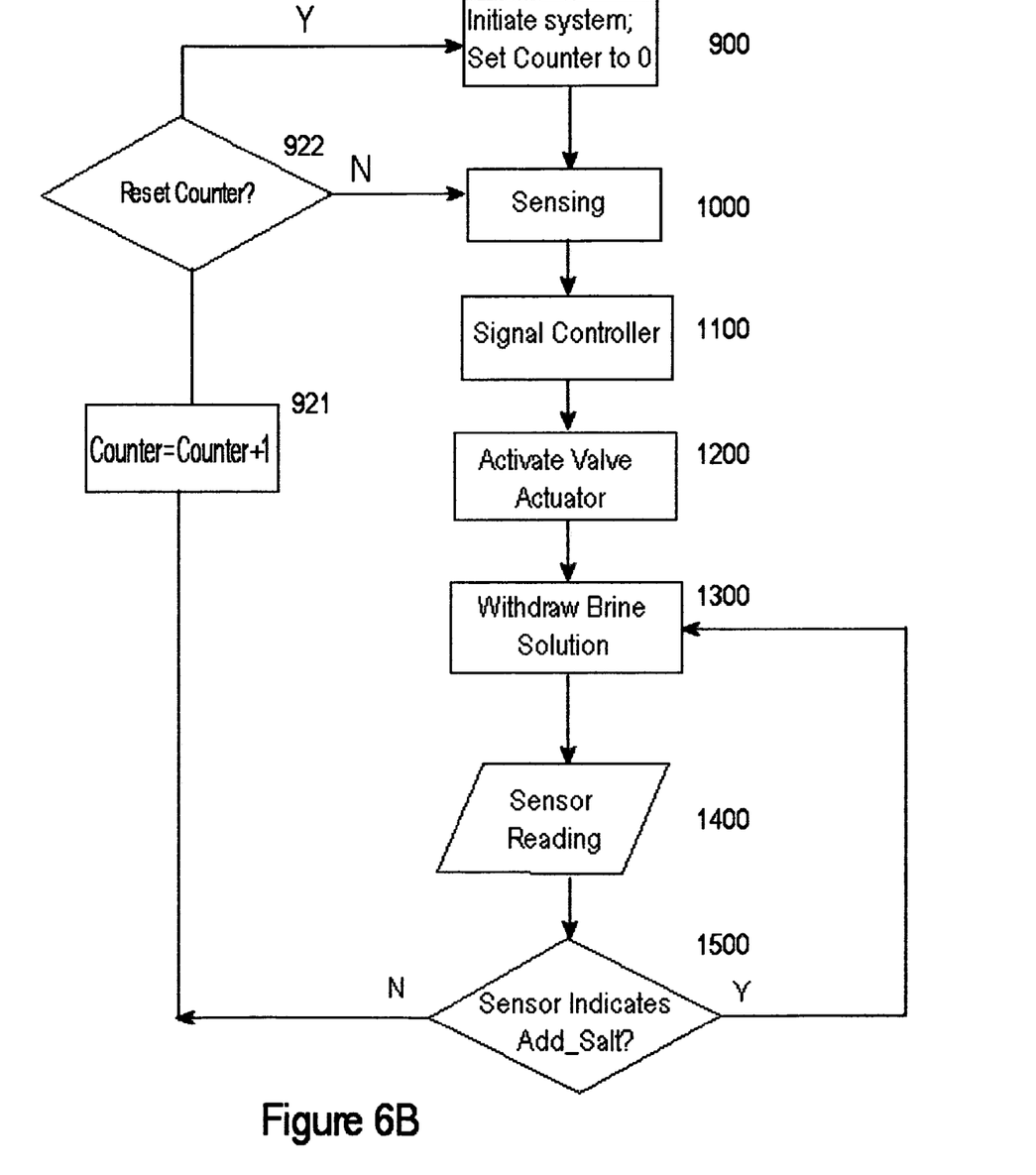
FIG. 6B is a flow chart of an exemplary method of operation for still another an exemplary embodiment of the instant invention.

FIG. 6B is a flow chart of a method of operation for an exemplary embodiment of the instant invention. The method of operating the salt dispensing system includes a first step 900 of setting a counter to zero. Again, this method step sets the start up of the system and can either be continuously set and monitored by the controller or can be part of a timer setup running on the pool pump schedule. The method of operating the system is similar to that of FIG. 6A and includes sensing whether the water body needs salt added in method step 1000, sending a signal is to the controller in step 1100, activating in response to the signal valve actuator(s) in step 1200. Again, the system runs with a continuously filled brine solution holding tank.

However, the valve actuator(s) receives the signal and activates the valve in steps 1100 and 1200 sending the water through the plumbing loop, creating a suction force in the venturi suction fitting. In step 1400, the counter or timer is incrementally increased. After a pre-determined amount of time or cycles is reached in step 1200, the controller reverses the actuator(s) and the withdrawal step is stopped. The method loops back to the initial counter setting step 900 and then proceeds to the sensing step 1000 from step 1400, sensing and monitoring whether the salt level has stabilized or not and can continue the method again if necessary with the aforementioned method steps until the desired parameters are met.

In an optional method step, the activation step can include activating first and second actuators that can be regulated by the controller. One actuator regulates the amount of flow through the venturi fitting, creating suction and the other regulates the amount and timing of water flowing in the opposite direction through the venturi fitting thereby providing pressurized water back through the venturi fitting and into the brine tank. With this arrangement, the controller can, at regular intervals, add and subtract small amounts of water to the tank and the system to avoid algae and bacteria growth thereby reducing the need for periodic system maintenance and lowering costs of operation.

In a further additional method step, a timer and/or counter step may optionally be included. If after a certain number of cycles or a certain amount of time or even after sensing too large an imbalance relative to the sensor reading, the controller may optionally send a visible signal for display at the unit or at a point more easily detectable by the end user or may automatically shut the system down. This may also trip an optional warning system, which can comprise any suitable combination of audible, visual, or similar warning signals to provide notification to the end user. For in stance, in the exemplary embodiment of the control panel shown in FIG. 8, there are four LED light indicators.

In a further optional method step, the activating step can include activating a first actuator that can be regulated by the controller to vary the amount of water going through the plumbing loop and venturi. Depending on the flow and pressure, the pressure differential going through the venturi can either create a suction to drain the tank or if the differential is low, to fill the tank. With this arrangement the controller in conjunction with the actuator can, at regular intervals, add and subtract small amounts of water to the tank and the system to avoic algae and bacteria growth as well as dispensing large amounts of saturated brine solution.

Figure 7:
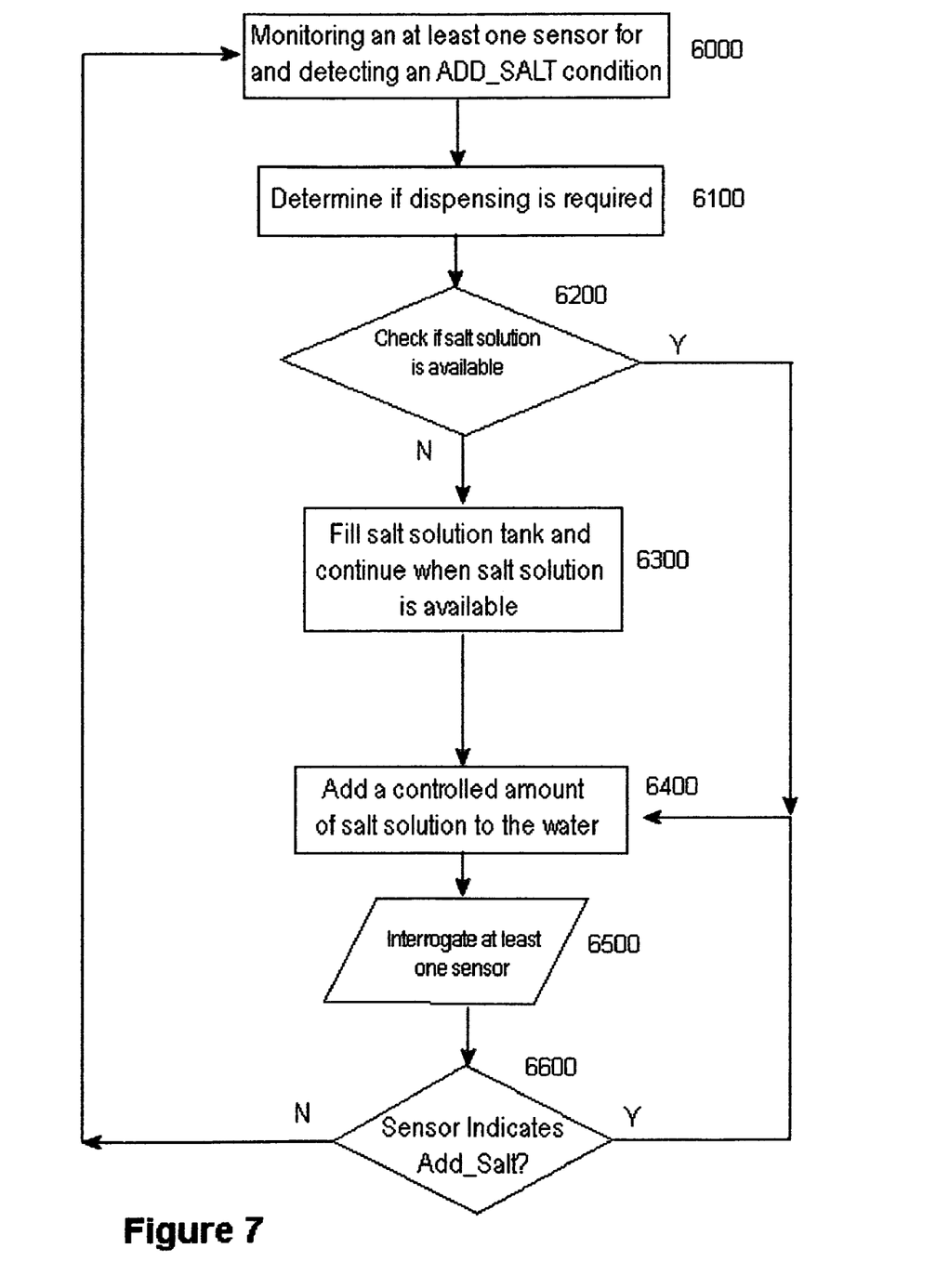
FIG. 7 is a flow chart of a further method of operation for yet another exemplary embodiment of the instant invention.

FIG. 7 is a flow chart of a further method of operation for yet another exemplary embodiment of the instant invention. This method can be carried out by a computer controller having software and executing the method of operation of the instant invention through the software. The instant invention will dispense salt according to the salt requirements of the chlorine generator of the salt-dispensing system. In a first operational step 6000, the sensors of the chlorine generator reports directly to the controller of the instant invention or to a master controller which communicates and integrates with the controller of the instant invention in monitoring and maintaining the parameters of the circulating water. The controller interrogates the salt chlorine generator and its sensors for an indication of a low salt or add_salt condition in step 6000.

After the controller interrogates the salt chlorine generator and requests the latest salt level, the controller can perform a check or calculation to determine if dispensing is required in step 6100. The controller can be provided a large number of variable to calculate whether dispensing is required, with, for example, sensors and other reports from system devices providing data on the size and status of the body of water it is treating, with set parameters that can include but are not limited to salinity, volume of water, water temperature, chlorine levels, pH levels, and similar characteristics. These parameters may also be preprogrammed or manually inputted into the salt-dispensing system. An optional method step includes providing a user with a series of settings on a dial or light bar that can regulate the amount of salt dispensed into the pool and allowing them to set the dial as part of determining step.

In embodiments utilizing multiple salt chlorine generators, each of the salt chlorine generators is connected to a master control panel that communicates with the individual salt chlorine generators, the master controller or salt-dispensing system controller listens to the communication between the generators and the panel and determines if a low salt message is being reported.

If an add_salt condition exists and dispensing is required in step 6200, the salt-dispensing system checks to see if salt solution is available. If the solution is available, the method follows the affirmative path to the adding step 6400. If no salt solution is available the method follows the negative path and the controller activates valve actuator(s) and opens the necessary valves in step 6300 to fill salt storage tank in the exemplary embodiment. The salt dispensing system engages valve actuators or gate valves, for example, to control the water flow in and out of the salt storage tank. The salt-dispensing system can then wait for a specified period of time while the water in tank saturates with the salt, creating brine. This can be accomplished in a number of ways.

A non-limiting example can utilize a timer that commences counting for a predetermined length of time to halt the process while waiting for the water to saturate with salt. Additionally non limiting examples include using a specific length of time programmed into the controller and monitored via a clock on the controller or any other method of halting a control algorithm for a period of time. The time and duration and the specific process of filling and creating a salt brine solution may be varied without departing from the spirit of the method of control of the instant invention. The variations in the time delay are directly related to the volume, the form of the salt (e.g. tablets or granularized), and the saturation level desired in the tank and can be varied to suit the particular pools. For instance, the instant invention can wait for a full twenty-four hours while the salt saturates the water in the tank. The following day the brine can be dispensed into the pool. In other applications depending on the type of salt used, fine grain or pellets, no wait time would be necessary. In these embodiments, the method of operation is simplified in that, the tank is simply filled and then a brine solution is ready to be drained. Other methods, like those of FIGS. 6A and 6B, would be to keep the tank filled continuously and then simply withdraw the solution from the tank.

After the period of time passes and the brine solution is available, the controller continues to the further method step of adding a controlled amount of salt solution to the water when available, method step 6400 in the exemplary embodiment of the method. The salt-dispensing controller continues to interrogate the chlorine generator and, in some embodiments, additional sensors for the add_salt condition in method step 6500. The salt-dispensing system continues to dispense salt as long as an add_salt condition exists or for a predetermined amount of time. In an exemplary embodiment, the salt-dispensing system will add brine solution to the pool at a preset amount, ranging from 40 to 80 pounds salt equivalent, on a daily basis until the installed salt chlorine generator and the sensors determines sufficient salt is in the pool. The daily basis of dispensing allows the brine solution to thoroughly mix with the pool water, although the salt-dispensing system can be adjusted to add more regularly through out the day or can be adjusted through the controller. As noted above, the controller may be pre-programmed with additional parameters or receive additional input from other controllers and sensors. Based on these inputs, the amount of salt, the timing of the addition of the salt, the rate of the addition of the salt and similar properties of the inflow of salt into the water from the salt-dispensing system can be varied.

In method step 6500, the sensors are again interrogated to determine if the add_salt condition still exists. If the water condition indicated in method step 6600 shows an add_salt condition, the method returns along the positive branch of method step 6600 to the add step 6400. If the add_salt condition is not indicated in method step 6600, the add_salt condition is reset or turned off in the negative branch of step 6600 and the method returns to its initial step 6000 and begins to monitor the system again.

The controller and system operation schedule can be varied to suit the application. The system can, for example, be constantly powered on and monitoring the water condition. In addition; it can follow a filter pump schedule, for instance in a pool application, and begin its method of interrogating its sensors at that time. It can essentially be turned on and perform its duties on any periodic schedule or always be powered depending on the particular application.

A further optional method step would include cleansing or backfilling the brine solution tank. Due to the existing design of the salt storage tank, similar to a residential water softener, standing water may remain on the tank bottom possibly promoting algae growth. In the exemplary embodiment, the master or system controller monitors the condition of the tank and the system controller periodically flushes this water before any growth can occur, to minimize this condition. Other methods of sanitizing this residual water may be also employed and incorporated into the method of operation of the salt dispensing system.

Figure 8:
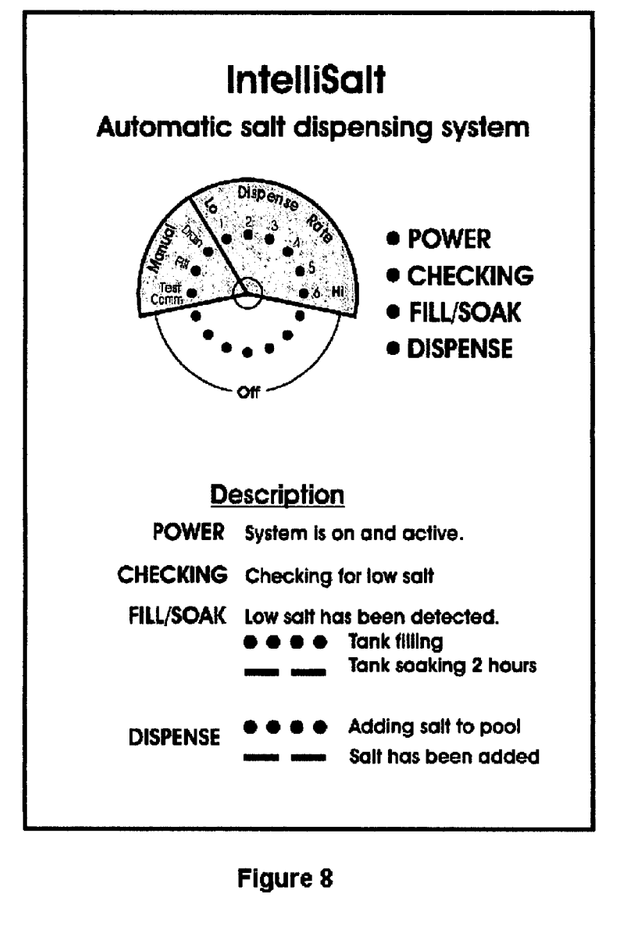
FIG. 8 shows an exemplary embodiment of a user interface for the instant invention.

FIG. 8, shows an exemplary embodiment of a user interface. The display may be active, however, if the system is coupled to a master controller, the display may be overridden and the information may be displayed by the master controller. In the exemplary embodiment, the display for the system has a series of status indicators, for example four LEDs, showing power, dispensing status, detected status and similar information to the user. Each light indicator either lights up when a separate operation is detected or operating or is blinking to indicate a cycle. A audible warning could be included as well.

The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. An automated salt dispensing system operating in conjunction with an at least one salt chlorine generator, comprising:

a controller;

a first of an at least two water supply pipes with an at least one inflow end and an at least one outflow end;

a second of an at least two water supply pipes with an at least one inflow end and an at least one outflow end;

an at least one water diversion pipe communicating with the first of an at least two water supply pipes;

an at least one actuator in communication with the controller and controlling a control valve, said control valve being coupled to said first of an at least two water supply pipes and said at least one diversion pipe and diverting water into said water diversion pipe;

an at least one brine solution holding tank having water and salt contained therein forming a brine solution and communicating with said second of an at least two water supply pipes; and an at least one pressure differential device, wherein the at least one brine solution holding tank is coupled to said at least one pressure differential device and the controller signals the actuator and the control valve diverts water from the first of an at least two water supply pipes into the water diversion pipe and the at least one pressure differential device draws brine solution from an at least one brine solution holding tank into the water supply line.

2. The automated salt dispensing system of claim 1, further comprising an at least one sensor for detecting an at least one condition of the automated salt dispensing system.

3. The automated salt dispensing system of claim 2, wherein the at least one condition is at least one of a condition of the at least one salt chlorine generator, a condition of the water supply at the outflow end, a condition of the water supply at the inflow-end, a condition of the brine solution and a condition of the brine solution tank.

4. The automated salt dispensing system of claim 2, wherein the at least one sensor for detecting a condition of the automated salt dispensing system detects at least one of a salinity, a volume, a temperature, a chlorine level, and a ph level within the system.

5. The automated salt dispensing system of claim 3, wherein the sensed conditions include measuring pH anywhere in the system and transmitting this information to the controller to adjust the diversion of water, the drawing of brine solution or a combination of the diversion of water and drawing of brine solution within the system.

6. The automated salt dispensing system of claim 3, wherein the at least one sensor provides data on the volume and status of the water within the system, including at least one of the salinity, volume of water passing the sensor, water temperature, chlorine levels, and pH levels.

7. The automated salt dispensing system of claim 3, further comprising a brine solution water supply line for supplying water to said brine solution tank wherein the at least one sensor includes an at least one sensor measuring the conditions of the brine solution and the brine tank including at least one of the temperature of the incoming water supplied by the brine solution water supply line, the time the water supplied by the brine solution water supply line is in the brine tank, the form of salt in the brine solution tank, the type of salt in the brine solution tank, and the flow characteristics within the brine tank.

8. The automated salt dispensing system of claim 2, wherein the at least one pressure differential device is a venturi device.

9. The automated salt dispensing system of claim 8, further comprising a brine solution water supply line for supplying water to said brine solution tank.

10. The automated salt dispensing system of claim 9, wherein a low flow rate within the diversion line results in a positive pressure at the venturi device and fills the brine tank with water through the diversion line acting as the brine solution water supply line.

11. The automated salt dispensing system of claim 9, wherein a high flow rate within the diversion line results in a negative pressure at the venture device and draws brine solution from the brine tank.

12. The automated salt dispensing system of claim 2, wherein the at least one salt-chlorine generator is a single salt chlorine generator.

13. The automated salt dispensing system of claim 2, wherein the at least one actuator is a single actuator.

14. The automated salt dispensing system of claim 13, wherein the single actuator is a 3-way actuated valve.

15. The automated salt dispensing system of claim 2, further comprising a level sensor sensing the level of brine solution in the brine tank.

16. The automated salt dispensing system of claim 15, wherein the brine tank level sensor is a float with a float position sensor.

17. The automated salt dispensing system of claim 2, further comprising an at least one acid compensator.

18. The automated salt dispensing system of claim 2, wherein the inflow end and outflow end are in communication with a body of water.

19. The automated salt dispensing system of claim 18, wherein the body of water is a pool or spa.

20. The automated salt dispensing system of claim 2, wherein the controller stores data from the at least one sensor.

21. The automated salt dispensing system of claim 20, wherein the controller provides for historic data storage and retrieval of data from the sensors with the aid of an at least one computer-readable media.

22. The automated salt dispensing system of claim 20, further comprising an at least one computer-readable media and a transmitting device for transmitting the data via wired or wireless communication to at least one of outside controllers, computers, storage media, or handheld devices.

23. The automated salt dispensing system of claim 3, wherein the pressure differential device further comprises at least one of a gravity pump, a powered pump, and a systolic pump.

24. An automated salt dispensing system operating in conjunction with an at least one salt chlorine generator, comprising:
 a controller;
 a first water supply pipe of an at least two water supply pipes with an at least one inflow end and an at least one outflow end;
 a second water supply pipe of an at least two water supply pipes with an at least one inflow end and an at least one outflow end;
 an at least one brine solution holding tank having at least one of salt, water, and brine contained therein to form a brine solution and coupled to said second water supply pipe of an at least two water supply pipes;
 an at least one actuator in communication with the controller and controlling a control valve, said control valve being coupled to said second water supply pipe of an at least two water supply pipes and said at least one brine solution holding tank, the control valve controlling the flow of water into the brine solution holding tank from the second water supply pipe; and
 an at least one pressure differential device, wherein the at least one brine solution holding tank is coupled to said at least one pressure differential device and the controller signals the at least one pressure differential device to withdraw brine solution with the at least one actuator diverting water from the first water supply pipe of an at least two water supply pipes into a water diversion pipe and the at least one pressure differential device drawing brine solution from an at least one brine solution holding tank into the water diversion pipe allowing the brine solution to enter the first water supply line.

* * * * *